United States Patent
Boerstler et al.

(10) Patent No.: US 6,483,888 B1
(45) Date of Patent: Nov. 19, 2002

(54) CLOCK DIVIDER WITH BYPASS AND STOP CLOCK

(75) Inventors: David W. Boerstler, Round Rock; Gary D. Carpenter, Pflugerville; Hung C. Ngo, Austin; Kevin J. Nowka, Round Rock, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/974,987

(22) Filed: Oct. 11, 2001

(51) Int. Cl.[7] ............................................... H03K 21/00
(52) U.S. Cl. ......................... 377/47; 327/115; 327/117; 327/159; 327/415
(58) Field of Search ................................ 327/115, 117, 327/159, 415, 47

(56) References Cited

U.S. PATENT DOCUMENTS 6,201,448 B1 * 3/2001 Tam et al. ..................... 331/25

\* cited by examiner

*Primary Examiner*—Margaret R. Wambach
(74) *Attorney, Agent, or Firm*—Richard F. Frankeny; Winstead Sechrest & Minick P.C.; Casimer K. Salys

(57) ABSTRACT

A clock divider circuit receives a first clock signal and frequency divides the first clock signal to generate a second clock signal. The first and second clocks are inputs to multiplexer (MUX) that selects one of the clocks as the MUX output based on the state of a MUX control signal. The MUX output is combined with a latched Freeze clock signal in an AND gate to generate a clock output signal. The state of Bypass logic signal determines which clock signal is selected as the clock output signal. The Bypass logic signal is received in a latch circuit which latches the Bypass logic signal in two series latches one latch latching on the positive edge and one on the negative edge of the MUX output. The output of the second latch is latched in a third latch on when a NOR logic gate signals the first and second clock are concurrently at a logic zero assuring that the MUX output is changed only when both clocks are low. The clock output signal is gated with the latched Freeze clock signal in the AND logic gate. The clock output signal is stopped or started depending on the state of the latched Freeze clock signal. A Freeze clock signal is received in a first latch when the MUX output transitions to a logic one and is latched in a second latch when the MUX output transitions to a logic zero generating the latched Freeze clock signal. The clock output signal is stopped or started when the MUX output is a logic zero assuring that the clock output signal stops at a logic zero or starts on a next positive transition of the MUX output.

20 Claims, 5 Drawing Sheets

CLOCK DIVIDER WITH BYPASS AND STOP CLOCK

CROSS REFERENCE TO RELATED APPLICATION

The present invention is related to the following U.S. patent applications which are incorporated by reference:

Ser. No. 09/974,990 entitled "Glitchless Clock Selector" filed concurrently herewith, Ser. No. 09/974,969 entitled "Multi-mode VCO" filed concurrently herewith, Ser. No. 09/975,187 entitled "Duo-mode Charge Pump" filed concurrently herewith, and Ser. No. 09/974,985 entitled "Dynamically Scaled Low Voltage Clock Generator System" filed concurrently herewith.

TECHNICAL FIELD

The present invention relates in general to circuits for generating and controlling computer clocks and in particular to circuits for selecting clock signals.

BACKGROUND INFORMATION

Phase-locked loops (PLL's) have been widely used in high-speed communication systems because PLL's efficiently perform clock recovery or clock generation at a relatively low cost. Dynamic voltage and frequency scaling is a critical capability in reducing power consumption of power sensitive devices. Scaling, in this sense, means the ability to select high performance with a nominal power supply voltage and a high frequency clock operation or low performance by reducing the power supply voltage and the corresponding clock frequency. Reducing the system power is usually done when performance is not needed or when running from a limited energy source such as a battery. To allow low power operation, the PLL and other circuits must support very aggressive power/energy management techniques. For the PLL this means low power operation while supporting key required features such as dynamic frequency scaling, dynamic voltage scaling, clock freezing and alternate low frequency clocking. Dynamic implies that the PLL is able to support changes in the output frequency and logic supply voltage without requiring the system to stop operation or waiting for the PLL clock to reacquire lock.

Using a PLL or delay-locked loop (DLL) has advantages in a battery powered system because a PLL is able to receive a lower frequency reference frequency from a stable oscillator to generate system clock frequencies. A PLL also allows changing the system clock frequency without changing the reference frequency.

In switching between two or more clocks in a PLL or other logic system it may be important for the switching to be glitch-free. For example, transients that occur on a clock in a computer system may be mistaken by the logic system as a valid clock edge and thus create timing problems or system failures. In a system employing frequency scaling, it is desirable to select between a high frequency clock, and a divided lower frequency clock, and stopping either selected clock and restarting with the selected clock in a glitch-free circuit.

There is, therefore, a need for a circuit for selecting between two synchronous clocks while incorporating a mode for stopping either clock in a known state and restarting a stopped clock on a known transition while assuring glitch-free switching.

SUMMARY OF THE INVENTION

A multiplexer (MUX) receives a high frequency clock and a low frequency clock divided from the high frequency clock. A latch circuit receives a Bypass signal which selects one of the clocks. The state of the Bypass signal is latched in a first latch when the output of the MUX transitions to a logic one. A second latch circuit receives the output of the first latch and latches the state of its output when the MUX output transitions to a logic zero. A third latch circuit receives the output of the second latch and latches the state of its output when both the high frequency and low frequency clock are concurrently at a low level. The output of the third latch is the MUX control signal that selects either the high frequency or a low frequency clock while guaranteeing that a cycle with a new clock begins on the first positive logic transition following a state when both clocks are at a logic zero. The output of the MUX is coupled to a logic AND gate that is gated with a latched Freeze clock signal that determines whether the clock output signal is active or is held at a logic zero state. The state of a Freeze clock signal is latched in a fourth latch when the MUX output transitions to a logic one. A fifth latch latches the output of the fourth latch when the MUX output transitions to a logic zero guaranteeing that the MUX output is selected as the clock output signal when the MUX output is a logic zero (starts on the next transition to a logic one) or that the clock is "frozen" low when the clock output signal is at a logic zero, resulting in no glitches. The clock output signal is stopped when it is low and re-started when the MUX output is a logic zero assuring that the clock output signal is glitch-free during switching of the MUX or when a clock output signal is stopped or started.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
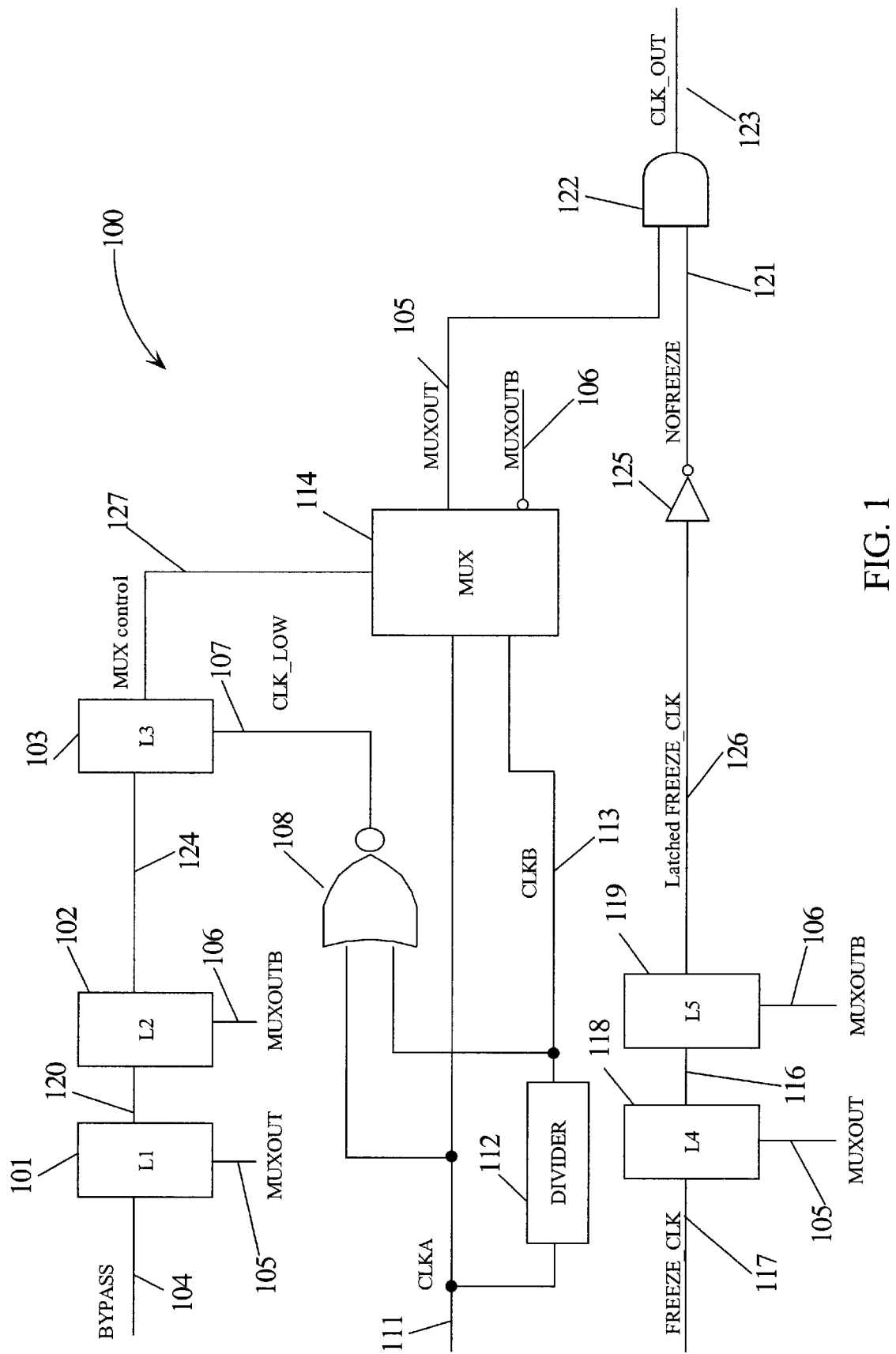
FIG. 1 is a circuit diagram of the clock bypass circuit according to embodiments of the present invention.

In the following description, numerous specific details are set forth to provide a thorough understanding of the present invention. However, it will be obvious to those skilled in the art that the present invention maybe practiced without such specific details. In other instances, well-known circuits have been shown in block diagram form in order not to obscure the present invention in unnecessary detail. For the most part, details concerning timing considerations and the like have been omitted in as much as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views. In the following detailed descriptions, a logic zero is a low or zero voltage and a logic one is a high or a plus supply voltage to simplify explanation of embodiments of the present invention.

FIG. 1 is a circuit diagram of the clock bypass circuit 100 with the Freeze clock mode. Bypass signal 104 is a logic signal used to select CLKA 111 in one logic state and CLKB 113 in the other logic state. CLKB 113 is generated by frequency dividing CLKA 111 in frequency divider 112 assuring the clocks are synchronous. Multiplexer (MUX) 114 selects between CLKA 111 and CLKB 113 generating a MUXOUT 105 and an inverted MUX output (MUXOUTB) 106. Depending on the state of NOFREEZE signal 121, CLK_OUT 123 follows the output of MUXOUT 105 or is "frozen" at a logic zero level.

When BYPASS 104 changes state, the new state is latched into latch L1 101 on a positive transition of MUXOUT 105 and generates latched output 120. The new state of latched output 120 is latched into latch L2 102 and generates latched output 124 on the next positive transition of MUXOUTB 106. Correspondingly, the new latched output 124 is latched into latch L3 103 when CLK_LOW 107 is a logic one generating a new MUX control 127 which selects either CLKA 111 or CLKB 113 as MUXOUT 105. CLKA 111 and CLKB 113 are combined in a NOR logic gate 108 to generate CLK_LOW 107. CLK_LOW 107 is a logic one if both CLKA 111 and CLKB 113 are a logic zero, and a logic zero at all other times. This guarantees that the new state of BYPASS 104 is not presented as MUX control 127 until both clocks are at a logic zero following a state change of BYPASS 104.

If FREEZE_CLK 117 changes state, the new state is latched into latch L4 118 on the next positive transition of MUXOUT 105 thereby generating latched output 116. The new state of latched output 116 is latched into latch L5 119 on the next positive transition of MUXOUTB 106 (negative transition of MUXOUT 105). If the state of FREEZE_CLK 117 stops CLK_OUT 123, this sequence assures that stopping occurs when CLK_OUT 123 is at a logic zero assuring no glitches. If the state of FREEZE_CLK 117 restarts a clock, latching sequence assures that CLK_OUT 123 begins on a valid positive transition following an actual MUXOUT 105 (selected clock) logic low state again assuring no glitches.

Figure 2:
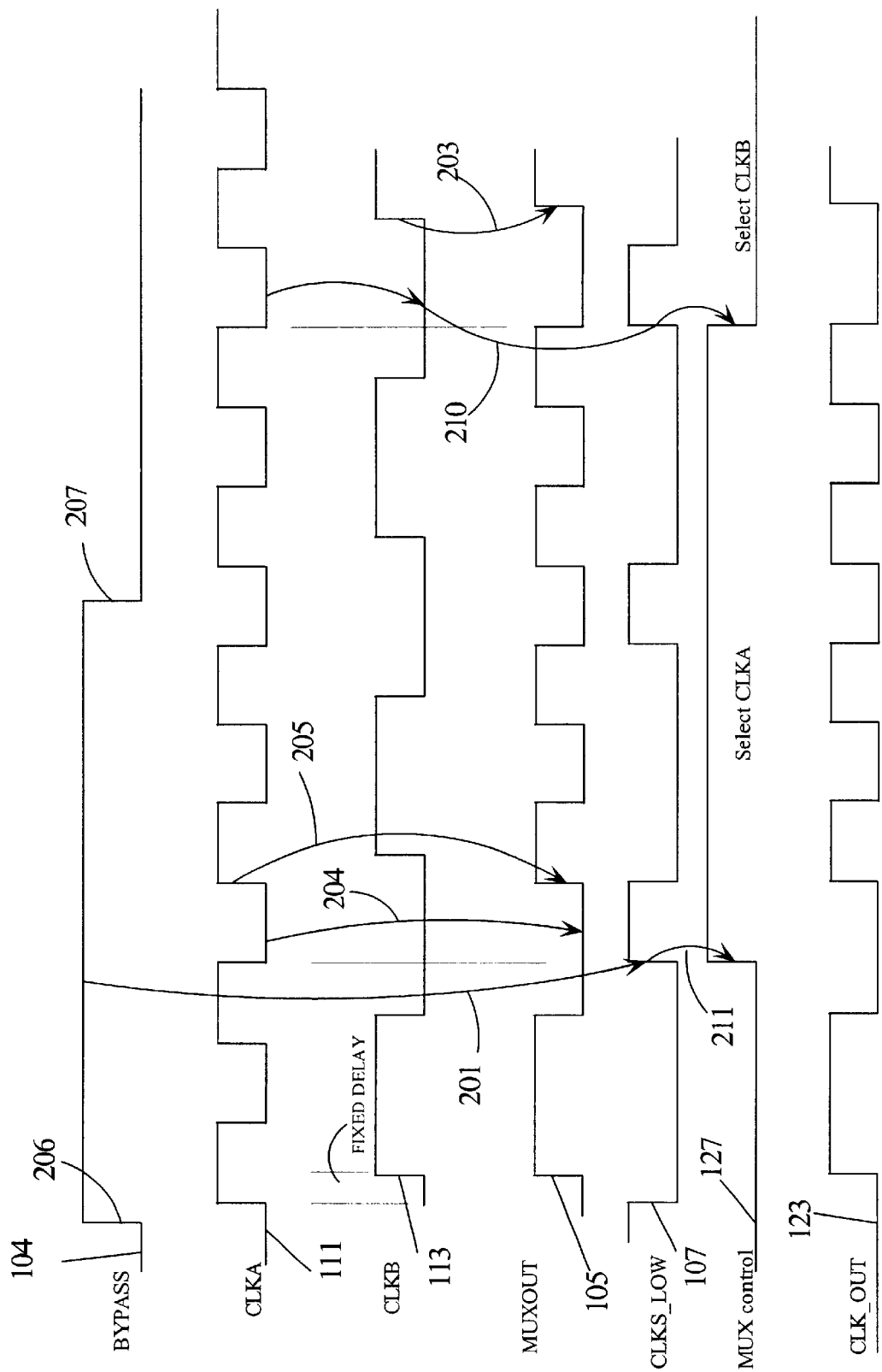
FIG. 2 illustrates waveforms of the clock bypass circuit when switching between clock signals.

FIG. 2 illustrates waveforms of some signals from the embodiment of the present invention in FIG. 1. BYPASS 104 transitions to a logic one on transition 206 signaling a switch from CLKB 113 to CLKA 111. It should be evident that the clock selected when BYPASS 104 is a logic one or zero is arbitrary. Since CLKB 113 is the present selected clock (MUXOUT 105), the first positive transition of CLKB 113, after BYPASS 104 transitions to a logic one, latches the new state in L1 101. The next negative transition of MUXOUT 105 (positive transition of MUXOUTB 106) latches the new state of BYPASS 104 into L2 102 as output 124. Output 124 is latched into L3 103 when CLK_LOW 107 transitions to a logic one. State arrow 201 shows that when BYPASS 104 is a logic one and CLK_LOW 107 transitions to a logic one, MUX control 127 transitions to a logic one (State arrow 211). Since both CLKA 111 and CLKB 113 are at a logic zero when MUX control 127 switches to CLKA 111 there are no glitches on CLK_OUT 123. State arrow 204 illustrates that both clocks are at a logic zero. CLK_OUT 123 begins on the next positive transition of the new selected clock (CLKA 111). State arrows 210 and 203 illustrates signal transitions when BYPASS 104 again signals (transition 207) selection of CLKB 113. During the conditions illustrated by the waveforms in FIG. 2, FREEZE_CLK 117 is at a logic zero signaling that the CLK_OUT 123 is to follow MUXOUT 105.

Figure 3:
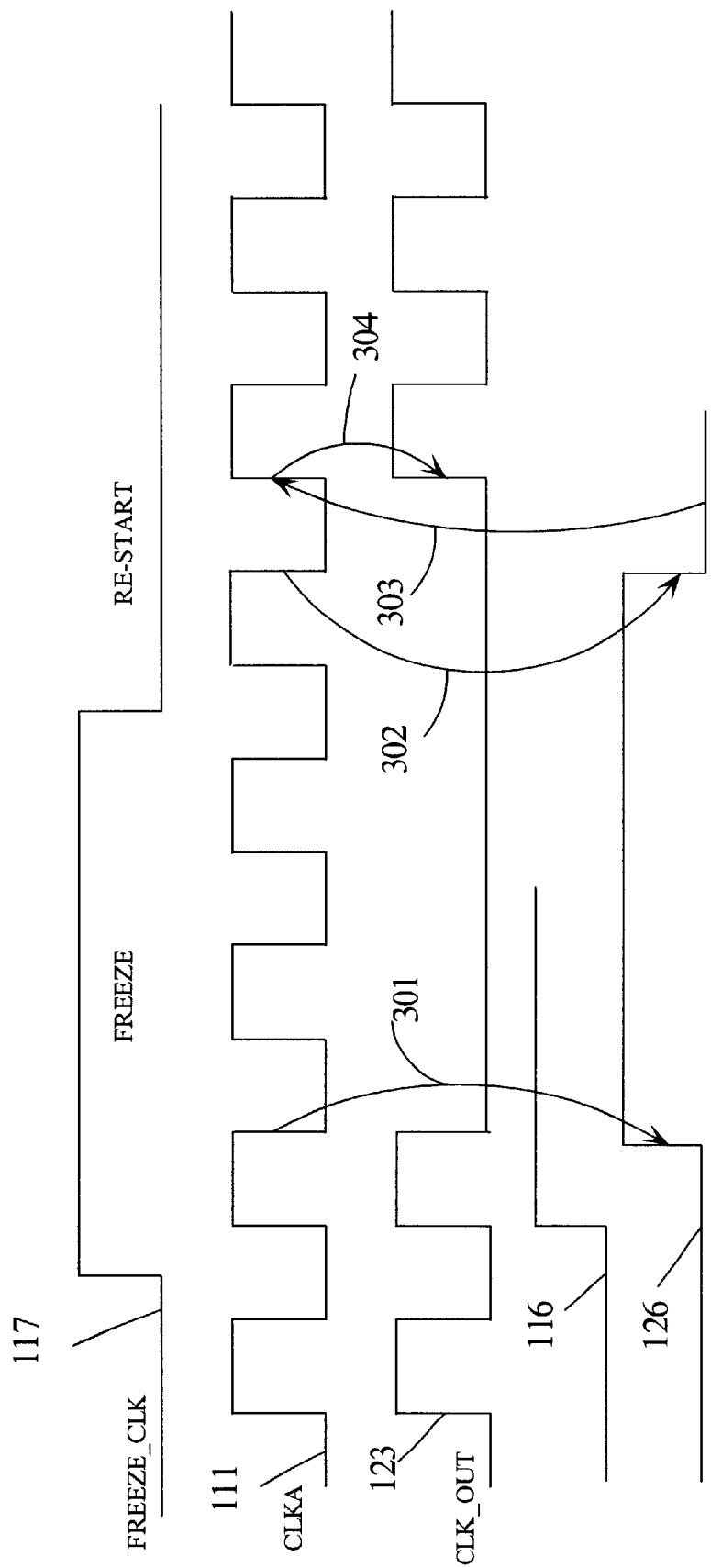
FIG. 3 illustrates waveforms of the Freeze clock mode of the clock bypass circuit according to embodiments of the present invention.

FIG. 3 illustrates some waveforms of FIG. 1 when FREEZE_CLK 117 transitions to a logic one (signaling to stop or freeze CLK_OUT 123). FIG. 3 assumes that CLKA 111 is selected as MUXOUT 105. The first positive transition of MUXOUT 105 latches the new state of FREEZE_CLK 117 into latch L4 118. On the next succeeding negative transition of MUXOUT 105 (positive transition of MUXOUT 106, the new state of FREEZE_CLK 117 is latched into L5 119. The output 126 of L5 119 (logic one) is inverted in inverter 125 and de-gates AND 122. Since MUXOUT 105 is de-gated by NOFREEZE 121 (state arrow 301) when MUXOUT 105 transitions to a logic zero, CLK_OUT 123 is guaranteed to be stopped or "frozen" at a logic zero with no glitches. Likewise, when FREEZE_CLK 117 transitions to a logic zero signaling a restart of CLK_OUT 123, NOFREEZE 121 transitions to a logic one when the selected clock transitions to a logic zero ensuring that CLK_OUT 123 re-starts on the next positive transition of the selected clock with no glitches (see state transitions 302–304).

Figure 4:
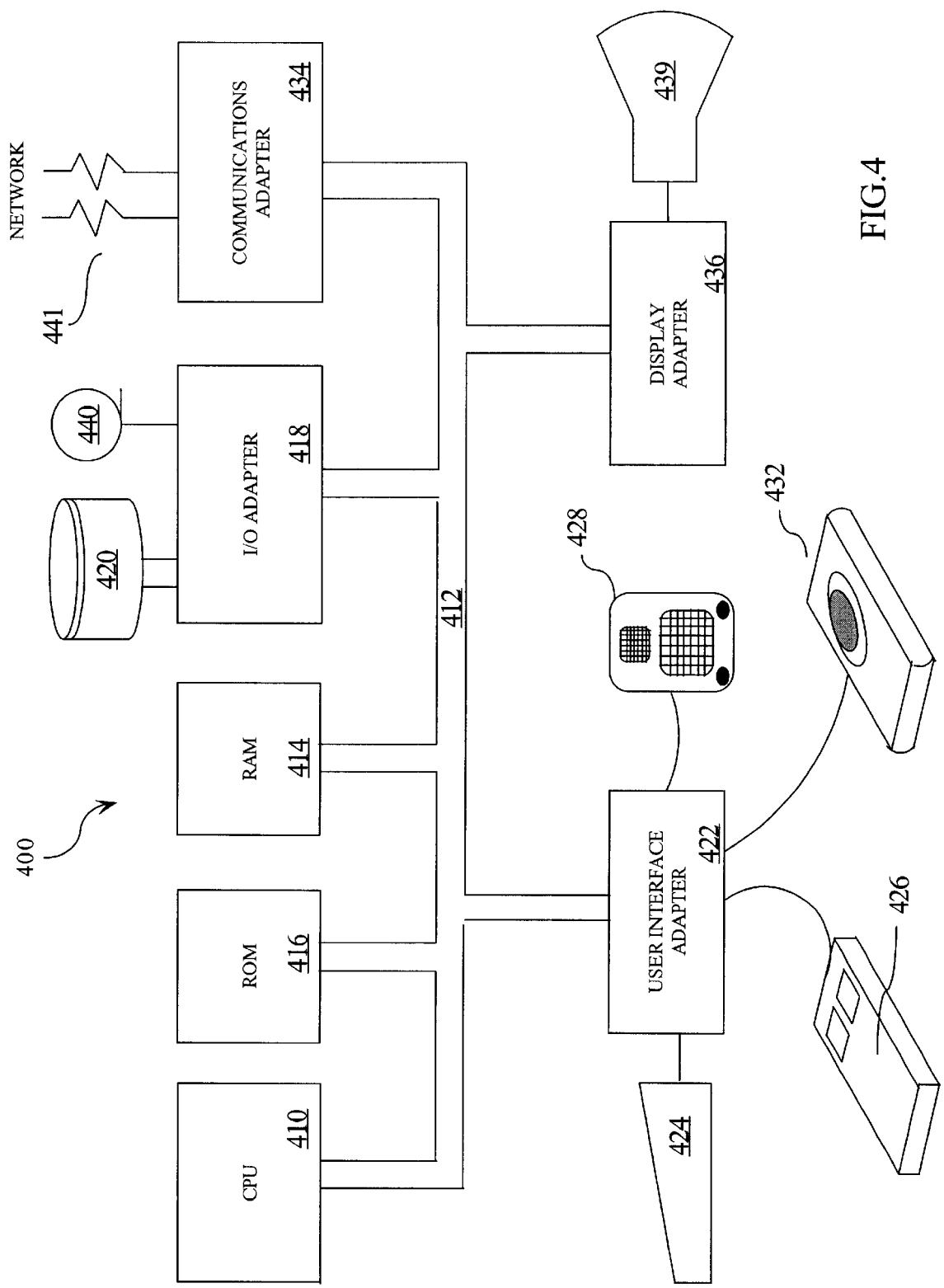
FIG. 4 is a data processing system with a CPU and other circuits suitable to use a clock bypass circuit with a Freeze clock mode according to embodiments of the present invention.

FIG. 4 is a high level functional block diagram of a representative data processing system 400 suitable for practicing the principles of the present invention. Data processing system 400, includes a central processing system (CPU) 410 operating in conjunction with a system bus 412. System bus 412 operates in accordance with a standard bus protocol, such that as the ISA protocol, compatible with CPU 410. CPU 410 operates in conjunction with electronically erasable programmable read-only memory (EEPROM) 416 and random access memory (RAM) 414. Among other things, EEPROM 416 supports storage the Basic Input Output System (BIOS) data and recovery code. RAM 414 includes, DRAM (Dynamic Random Access Memory) system memory and SRAM (Static Random Access Memory) external cache. I/O Adapter 418 allows for an interconnection between the devices on system bus 412 and external peripherals, such as mass storage devices (e.g., a hard drive, floppy drive or CD/ROM drive), or a printer 440. A peripheral device 420 is, for example, coupled to a peripheral control interface (PCI) bus, and I/O adapter 418 therefore may be a PCI bus bridge. User interface adapter 422 couples various user input devices, such as a keyboard 424, mouse 426, touch pad 432 or speaker 428 to the processing devices on bus 412. Display 439 which maybe, for example, a cathode ray tube (CRT), liquid crystal display (LCD) or similar conventional display units. Display adapter 436 may include, among other things, a conventional display controller and frame buffer memory. Data processing system 400 may be selectively coupled to a computer or telecommunications network 441 through communications adapter 434. Communications adapter 434 may include, for example, a modem for connection to a telecom network and/or hardware and software for connecting to a computer network such as a local area network (LAN) or a wide area network (WAN). CPU 410 may be operated in a system environment where it is desirable to use clock frequency and power supply voltage scaling to manage system power usage. Clocks in the CPU and other components may need to be bypassed or stopped glitch-free to prevent errors during times of frequency and voltage scaling. To ensure glitch-free operation of data processing system 400 when bypassing the system clock with a divided clock or when the stopping the system clock, CPU 410 and other components may use a clock selector with bypass and clock stopping functions according to embodiments of the present invention.

Figure 5:
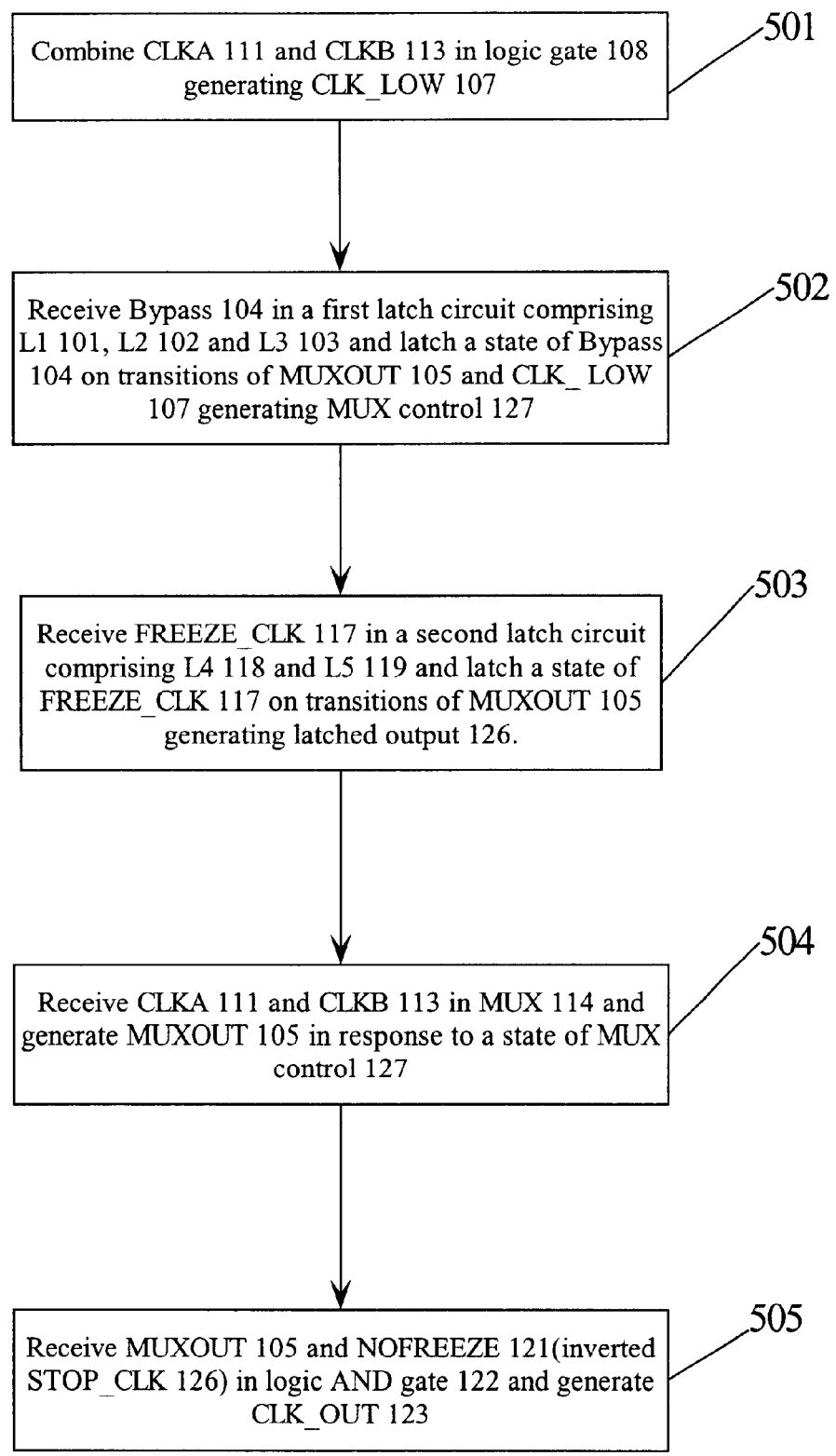
FIG. 5 is a flow diagram of method steps in embodiments of the present invention.

FIG. 5 is a flow diagram of method steps in embodiments of the present invention. In step 501, CLKA 111 and CLKB 113 are combined in logic NOR gate 108 generating a logic one when both CLKA 111 and CLKB 113 are concurrently a logic zero. In step 502, Bypass 104 is latched in a first latch circuit comprising L1 101, L2 102, and L3 103 and a state of Bypass 104 is latched on transitions of MUXOUT 105 and CLK_LOW 107 generating MUX control 127. In step 503, FREEZE_CLK 117 is latched in a second latched circuit comprising L4 118 and L5 119 and a state of FREEZE_CLK 117 is latched on transitions of MUXOUT 105 generating latched FREEZE_CLK 126. In step 504, CLKA 111 and CLKB 113 are received in MUX 114 and MUXOUT 105 is generated in response to state of MUX control 127. In step 505, MUXOUT 105 and NOFREEZE 121 (inverted latched FREEZE_CLK 126) are combined in logic AND 122 to generate CLK_OUT 123.

The present invention and its advantages have been described in detail, it should be understood that various changes, substitutions and alterations can be made herein without departing from the spirit and scope of the invention as defined by the appended claims.

What is claimed is:

1. A clock signal divider circuit generating a clock output signal comprising:
   a clock signal frequency divider receiving a first clock signal and generating a second clock signal; and
   a first sequential logic circuit receiving said first clock signal, said second clock signal, and a Bypass signal, said first sequential logic circuit generating a present selection of said clock output signal from said first clock signal and said second clock signal in response to a state of said Bypass signal and transition states of a previous selection of said clock output signal, said first clock signal, and said second clock signal.

2. The clock signal divider circuit of claim 1 further comprising:
   a second sequential logic circuit receiving a Freeze clock signal and said clock output signal and generating a Stop clock signal in response to said Freeze clock signal and transition states of said clock output signal; and
   a first logic circuit receiving said clock output signal and said Stop clock signal and generating a gated clock output signal by stopping and starting said clock output signal.

3. The clock signal divider circuit of claim 1, wherein said first sequential logic circuit comprises:
   a second logic circuit receiving said first clock signal and said second clock signal and generating a second logic circuit output;
   a first latch circuit receiving said Bypass signal, said clock output signal, and said second logic circuit output and generating a MUX control signal by latching a state of said Bypass signal in response to transitions of said clock output signal and said second logic circuit output; and a multiplexer (MUX) receiving said first clock signal and said second clock signal, and generating a present selection of said clock output signal in response to a state of said MUX control signal.

4. The clock signal divider circuit of claim 2, wherein said second sequential logic circuit comprises:
   a second latch circuit receiving said Freeze clock signal and said clock output signal and generating said Stop clock signal by latching a state of said Freeze clock signal in response to transitions of said clock output signal.

5. The clock signal divider circuit of claim 2, wherein said first logic circuit comprises a logic AND circuit.

6. The clock signal divider circuit of claim 3, wherein said first latch circuit comprises:
   a first latch receiving said Bypass signal and generating a first latched output by latching a state of said Bypass signal in response to a transition of said clock output signal to a logic one state;
   a second latch receiving said first latched output and generating a second latched output by latching a state of said first latched output in response to a transition of said clock output signal to a logic zero state; and
   a third latch receiving said second latched output and generating said MUX control signal by latching a state of said second latched output in response to a transition of said second logic circuit output to a logic one state.

7. The clock signal divider circuit of claim 3, wherein said second logic circuit generates said second logic circuit output as a logic NOR combination of said first clock signal and said second clock signal.

8. The clock signal divider circuit of claim 4, wherein said second latch circuit comprises:
   a fourth latch receiving said Freeze clock signal and generating a third latched output by a latching a state of said Freeze clock signal in response to a transition of said clock output signal to a logic one; and
   a fifth latch receiving said third latched output and generating said Stop clock signal by latching a state of said third latched output in response to a transition of said clock output signal to a logic zero.

9. The clock signal divider circuit of claim 1, wherein a present selection of said clock output signal is generated glitch-free when switching from one to the other of said first clock signal and said second clock signal.

10. The clock signal divider circuit of claim 2, wherein said gated clock output signal is stopped in a first logic state of said clock output signal following a transition of said Stop clock signal to a stop logic state and started on a transition of said clock output signal from said first logic state following a transition of said Stop clock signal to a start logic state, said gated clock started and stopped glitch-free.

11. A data processing system comprising:
   a central processing unit (CPU), operable at different clock signal frequencies, having a clock signal divider circuit receiving a first clock signal and generating a second clock signal and a first sequential logic circuit receiving said first clock signal, said second clock signal, a Bypass signal, said first sequential logic circuit generating a present selection of said clock output signal in response to a state of said Bypass signal and transition states of a previous selection of said clock output signal, said first clock signal and said second clock signal;
   a random access memory (RAM);
   a read only memory (ROM);

a communications adapter coupled to a communication network;

an I/O adapter; and a bus system coupling said CPU to said ROM, said communications adapter, said I/O adapter, and said RAM.

12. The data processing system of claim 11 further comprising:

a second sequential logic circuit receiving a Freeze clock signal and said clock output signal and generating a Stop clock signal in response to said Freeze clock signal and transition states of said clock output signal; and a first logic circuit receiving said clock output signal and said Stop clock signal and generating a gated clock output signal.

13. The clock signal divider of claim 11, wherein said first sequential logic circuit comprises:

a second logic circuit receiving said first clock signal and said second clock signal and generating a second logic circuit output;

a first latch circuit receiving said Bypass signal, said clock output signal, and said second logic circuit output and generating said MUX control signal by latching a state of said Bypass signal in response to transitions of said clock output signal and said second logic circuit output; and a multiplexer (MUX) receiving said first clock signal and said second clock signal, and generating a present selection of said clock output signal in response to a state of a MUX control signal.

14. The data processing system of claim 12, wherein said second sequential logic circuit comprises:

a second latch circuit receiving said Freeze clock signal and said clock output signal and generating said Stop clock signal by latching a state of said Freeze clock signal in response to transitions of said clock output signal.

15. The data processing system of claim 12, wherein said first logic circuit comprises a logic AND circuit.

16. The data processing system of claim 13, wherein said first latch circuit comprises:

a first latch receiving said Bypass signal and generating a first latched output by latching a state of said Bypass signal in response to a transition of said clock output signal to a logic one state;

a second latch receiving said first latched output and generating a second latched output by latching a state of said first latched output in response to a transition of said clock output signal to a logic zero state; and a third latch receiving said second latched output and generating said MUX control signal by latching a state of said second latched output in response to a transition of said second logic circuit output to a logic one state.

17. The data processing system of claim 13, wherein said second logic circuit generates said second logic circuit output as a logic NOR combination of said first clock signal and said second clock signal.

18. The data processing system of claim 14, wherein said second latch circuit comprises:

a fourth latch receiving said Freeze clock signal and generating a third latched output by a latching a state of said Freeze clock signal in response to a transition of said clock output signal to a logic one; and a fifth latch receiving said third latched output and generating said Stop clock signal by latching a state of said third latched output in response to a transition of said clock output signal to a logic zero.

19. The data processing system of claim 11, wherein a present selection of said clock output signal is generated glitch-free when switching from one to the other of said first clock signal and said second clock signal.

20. The data processing system of claim 12, wherein said gated clock output signal is stopped in a first logic state of said clock output signal following a transition of said Stop clock signal to a stop logic state and started on a transition of said clock output signal from said first logic state following a transition of said Stop clock signal to a start logic state, said gated clock started and stopped glitch-free.

* * * * *

UNITED STATES PATENT AND TRADEMARK OFFICE
CERTIFICATE OF CORRECTION

PATENT NO. : 6,483,888 B1
DATED : November 19, 2002
INVENTOR(S) : David W. Boerstler et al.

It is certified that error appears in the above-identified patent and that said Letters Patent is hereby corrected as shown below:

<u>Title page,</u>
Item [57], ABSTRACT,
Line 13, before "when" please delete -- on --.

<u>Column 7,</u>
Line 17, please replace "clock signal divider" with -- data processing system --.

Signed and Sealed this

Thirteenth Day of May, 2003

JAMES E. ROGAN
*Director of the United States Patent and Trademark Office*